United States Patent
Roberts et al.

(10) Patent No.: US 8,305,918 B2
(45) Date of Patent: Nov. 6, 2012

(54) METHOD OF CONFIGURING THE QUALITY-OF-SERVICE PROFILE OF A GIVEN STREAM AT AN ACCESS NODE OF A PACKET COMMUNICATIONS NETWORK

(75) Inventors: James Roberts, Voisins le Bretonneux (FR); Sara Oueslati, Chantillon (FR)

(73) Assignee: France Telecom, Paris (FR)

( * ) Notice: Subject to any disclaimer, the term of this patent is extended or adjusted under 35 U.S.C. 154(b) by 375 days.

(21) Appl. No.: 12/441,824

(22) PCT Filed: Sep. 18, 2007

(86) PCT No.: PCT/FR2007/051961
§ 371 (c)(1),
(2), (4) Date: May 6, 2009

(87) PCT Pub. No.: WO2008/035006
PCT Pub. Date: Mar. 27, 2008

(65) Prior Publication Data
US 2010/0046529 A1 Feb. 25, 2010

(30) Foreign Application Priority Data
Sep. 18, 2006 (FR) ...................................... 06 53791

(51) Int. Cl.
*H04L 12/26* (2006.01)
(52) U.S. Cl. .................... 370/252; 370/395.21; 370/401
(58) Field of Classification Search .......................... None
See application file for complete search history.

(56) References Cited

U.S. PATENT DOCUMENTS

| | | | |
|---|---|---|---|
| 6,693,912 B1* | 2/2004 | Wang | 370/401 |
| 7,532,613 B1* | 5/2009 | Sen et al. | 370/352 |
| 2004/0057456 A1 | 3/2004 | He et al. | 370/465 |
| 2004/0174883 A1* | 9/2004 | Johansson et al. | 370/395.31 |
| 2004/0258003 A1* | 12/2004 | Kokot et al. | 370/254 |
| 2005/0005023 A1 | 1/2005 | Dobbins et al. | |
| 2005/0059396 A1* | 3/2005 | Chuah et al. | 455/435.1 |
| 2005/0096063 A1* | 5/2005 | Muniere | 455/452.2 |
| 2005/0152370 A1* | 7/2005 | Meehan et al. | 370/393 |
| 2005/0232284 A1* | 10/2005 | Karaoguz et al. | 370/401 |
| 2007/0002868 A1* | 1/2007 | Qian et al. | 370/395.21 |
| 2008/0002592 A1* | 1/2008 | Yegani et al. | 370/252 |
| 2008/0107084 A1* | 5/2008 | Pichna et al. | 370/332 |

OTHER PUBLICATIONS

International Search Report from counterpart foreign Application No. PCT/FR2007/051961.

(Continued)

*Primary Examiner* — Gregory Sefcheck
*Assistant Examiner* — Salvador E Rivas
(74) *Attorney, Agent, or Firm* — David D. Brush; Westman, Champlin & Kelly, P.A.

(57) ABSTRACT

A method is provided for configuring the service quality profile of a given flow at the access node of a packet communication network to which is connected to the gateway of a receiving user of the flow. The method includes a step where the gateway determines on its own a service quality profile to be associated with the flow, that is triggered upon reception of a packet from the access node, and a step where the service quality profile thus determined is sent to the access node. The profile is used by the access node for transmitting packets intended for the gateway and belonging to the flow in question.

13 Claims, 3 Drawing Sheets

OTHER PUBLICATIONS

Papaioannou et al., "Efficient Agent-Based Selection of DiffServ SLAs over MPLS Networks Within the ASP Service Model," Journal of Network and Systems Management. vol. 10, No. 1, Mar. 2002.pp. 63-90 (XP002427221).

Chiu et al., "A State Dependent Dynamic Triggering Scheme for Flow-Based QOS Shortcuts," Proceedings of the International Teletraffic Congress. ITC-16. Teletraffic Engineering in a Competitive World. Edinburgh, UK (Jun. 7, 1999). vol. 3A, pp. 217-226 (XP000877628).

English Translation of the Preliminary Report on Patentability and Written Opinion for corresponding International Application No. PCT/FR2007/051961, filed Sep. 28, 2007.

* cited by examiner

METHOD OF CONFIGURING THE QUALITY-OF-SERVICE PROFILE OF A GIVEN STREAM AT AN ACCESS NODE OF A PACKET COMMUNICATIONS NETWORK

CROSS-REFERENCE TO RELATED APPLICATIONS

This Application is a Section 371 National Stage Application of International Application No. PCT/FR2007/051961, filed Sep. 18, 2007 and published as WO 2008/035006 on Mar. 27, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a technique for configuring the quality-of-service profile of a stream in a packet communications network.

BACKGROUND OF THE DISCLOSURE

Nodes in a packet communications network referred to as access nodes are more particularly responsible for routing packets sent to or received from user gateways over the final terminating connection between the communications network and the user. This connection is commonly referred to as the "last kilometer". A digital subscriber line access multiplexer (DSLAM) can execute this access node function and manage one or more digital subscriber lines. Alternatively, the access node can be a wireless access node, for example. The user gateway constitutes the unique entry point to the devices of one or more users.

A stream is characterized by a number of characteristics common to a number of packets. These characteristics, also known as identification elements, can be present in various layers of the Open Systems Interconnection (OSI) model. They can correspond to the contents of the source and/or destination address fields (layer 3) or any other field in the header of the packets, in particular the protocol type (layer 3) and the port numbers of TCP or UDP segments (layer 4). In the uplink direction, i.e. for packets of a stream coming from a user gateway and going to the access node, the user gateway is responsible for determining a stream category related to quality-of-service requirements and then for applying a quality-of-service profile as a function of the category of the stream concerned. It might be a question, for example, of giving preference to data packets of real-time calls over packets of applications such as internet browsing.

Where the downlink direction is concerned, i.e. for packets sent by the access node to the user gateway, there are bandwidth management techniques enabling sharing of bandwidth resources as a function of a stream category related to quality-of-service requirements. One such technique is described in US patent application 2005/0005023, for example. A table of streams is used to control traffic going to a user. When a packet of a stream is received, attributes representing the category of that stream are extracted and various masks applied in order to obtain an access key to the table of streams. That access key is used to define the quality-of-service profile to be applied to transmit the packets of the stream. The rules for managing the table are defined statically by the access node operator. Moreover, in peer-to-peer networks, some attributes are assigned dynamically, for example the TCP port number. Since the table management rules are defined statically, it follows that the method is not able to adapt to the appearance of streams that relate to categories that have not yet been referenced, for example streams transmitted in the context of the peer-to-peer network or in the context of implementing new applications that are unknown to the access node operator but that are nevertheless made available to users of the network of that operator from outside the network.

There is therefore a need for a technique for defining and modifying rules for managing the quality of service for user traffic going to the gateway.

SUMMARY

An aspect of the disclosure relates to a method of configuring the quality-of-service profile of a given stream in an access node of a packet communications network to which there is connected a user gateway that is the destination of said stream. The method includes:

a step triggered by reception of a packet from the access node in which, at its own initiative, the gateway determines a quality-of-service profile to be associated with a stream; and a step in which the gateway sends to the access node the quality-of-service profile as determined in this way, which profile is used by the access node to transmit the packets of the stream concerned whose destination is the gateway.

On initialization, there are no records in a table of streams associated with the gateway and storing quality-of-service profiles associated with stream identifiers, the gateway being located on the user premises. The method determines a quality-of-service profile to be associated with a stream and sends it to the access node. This profile determination step is triggered by reception of a packet coming from the access node. It is executed at the initiative of the user gateway and not at the request of some other network equipment. The pair consisting of the stream and the quality-of-service profile is stored in the table of streams associated with the gateway and communicated to the access node to enable it to adapt the quality-of-service profile of packets of the same stream that will subsequently be sent on the downlink. The criteria that determine this profile depend in particular on the application concerned or on the final destination of the packets within the user's installation. Since the quality-of-service profile is determined in the user gateway, it is based on packets that, where appropriate, have been decrypted by the gateway. The access node cannot extract the information needed to determine a quality-of-service profile if the packets are encrypted, since the decryption function is implemented in the user gateway. It is therefore particularly advantageous to effect this association between a stream and a quality-of-service profile in the user gateway.

The determination criteria can also evolve dynamically as a function of new applications initiated by a user connected to the user gateway and known only to the user. This is why it is more efficient to manage quality-of-service profile determination criteria in the user gateway. An embodiment of the invention also enables certain unwanted streams to be blocked by associating with them a specific quality-of-service profile.

The packet coming from the access node advantageously belongs to the stream concerned.

This makes it possible to determine the quality-of-service profile to be applied to the subsequent packets of the stream from information contained in the received packet, which in particular identifies the application and the destination of the stream within the user's installation.

In another implementation, the packet coming from the access node belongs to another stream and includes information concerning the creation of the stream concerned.

Thus the step of determining a quality-of-service profile of the stream concerned is triggered after decoding a packet of another stream containing information concerning the creation of the stream in question.

Moreover, the steps of determining and sending the quality-of-service profile are effected after a step of searching a table of streams that is associated with the gateway and that stores quality-of-service profiles associated with stream identifiers for an identifier of the stream and if the search result is negative.

The method executes the determination and sending steps, in particular if the packet belongs to a stream considered to be a new stream for the user gateway concerned. The method then includes a step of looking up the gateway in the table of streams in order to verify whether the stream is a new stream for the gateway. If so, the gateway then determines the quality-of-service profile to be associated with the stream and configures the access node in order for it to apply the associated quality-of-service profile.

Furthermore, on reception by the access node of a packet of a stream whose destination is the user gateway, there are executed:

a step of searching for a quality-of-service profile associated with the identifier of said stream in a table of streams that is associated with the node and that stores quality-of-service profiles associated with streams; and if the search result is negative, a step of sending the packet to the gateway using a default quality-of-service profile.

The access node manages a table of streams that also stores quality-of-service profiles associated with stream identifiers. As packets of a stream arrive, the table of streams associated with the access node is searched to determine whether it contains the identifier. If it does not contain the identifier, the access node sends the packet of the new stream to the user gateway to which the stream is addressed, applying a default quality-of-service profile. Unidentified streams must be able to reach the gateway so that the gateway can define a quality-of-service profile to be associated with the stream at the same time as limiting the flow of such streams in order to protect the quality of service of known streams.

Furthermore, the method includes a preliminary step of defining stream categories related to quality-of-service requirements and the step of determination by the gateway of a quality-of-service profile to be associated with the identifier of the stream includes:

a substep of selecting one of said categories for the stream concerned; and a substep of associating with the identifier of the stream, as a function of the category selected, a quality-of-service profile associated with said category.

Quality-of-service profile association rules are defined beforehand in the user gateway. From the information characterizing the stream, a stream category and the quality-of-service profile associated with that stream category are then determined by reading the quality-of-service profile association rules. These rules are managed for each user as a function of their requirements and can, where appropriate, be updated dynamically, in particular in order to take into account new applications or new services.

Furthermore, a parameter of the time of arrival of the packet of a stream is associated with the identifier of the stream concerned, said parameter being updated in the tables of streams respectively associated with the access node and the gateway on reception of a new packet of the stream, said method further including a step of eliminating streams inactive for a particular time period.

The tables respectively associated with the access node and the user gateway also store for each stream a parameter representing the time of arrival of the last packet of the stream to be received. The tables can therefore eliminate pairs corresponding to spent streams.

An aspect of the invention also relates to a packet communications network access node adapted to send packets of streams to user gateways as a function of quality-of-service profiles associated with the streams, the network being characterized in that it includes:

means for receiving from the gateway a quality-of-service profile to be associated with a stream; and means for storing in the table of streams the quality-of-service profile received by the reception means and for associating with the identifier the stream concerned.

An aspect of the invention further relates to a packet communications network user gateway adapted to receive packets of streams coming from an access node, the gateway including:

means for determining a quality-of-service profile to be associated with a stream following reception of a packet from the access node; and means for sending to the access node the determined quality-of-service profile for association with a given stream.

An aspect of the invention further relates to a system in a packet communications network including at least an access node as described above and at least a user gateway as described above.

An aspect of the invention further relates to:

a program for configuring stream quality-of-service profiles for a packet communications network access node, the program including program instructions for receiving from a gateway a quality-of-service profile to be associated with a stream and for storing the received quality of service to be associated with the stream concerned in a table of streams, said profile being used, when said program is executed by the access node, by the access node to send packets of the stream concerned whose destination is the gateway;

a storage medium that can be read by an access node and in which a program as described above is stored.

An aspect of the invention further relates to:

a program for use by a user gateway of a packet communications network to control the configuration of stream quality-of-service profiles in an access node of said network, the program including program instructions for executing those of the steps of the method described above that are executed by said gateway, when said program is executed by the gateway;

a storage medium that can be read by a user gateway in which a program as described above is stored.

An aspect of the invention further consists in a signal sent by a user gateway to an access node in a packet communications network and conveying an access node configuration message including a quality-of-service profile that is to be associated with a given stream determined by the gateway and is to be used by the access node to send packets of the stream concerned to the gateway.

BRIEF DESCRIPTION OF THE DRAWINGS

One or more aspects of the invention can be better understood with the aid of the following description of a method conforming to one particular implementation of the invention, which description is given with reference to the appended drawings, in which.

DETAILED DESCRIPTION OF ILLUSTRATIVE EMBODIMENTS

Note firstly that a stream corresponds to an exchange of packets between two machines of a packet communications network using packets that have common characteristics, in particular, here, common source, destination, and service characteristics. These characteristics are referred to below as stream characteristics. An identifier of a stream is constructed using these common characteristics.

Figure 1:
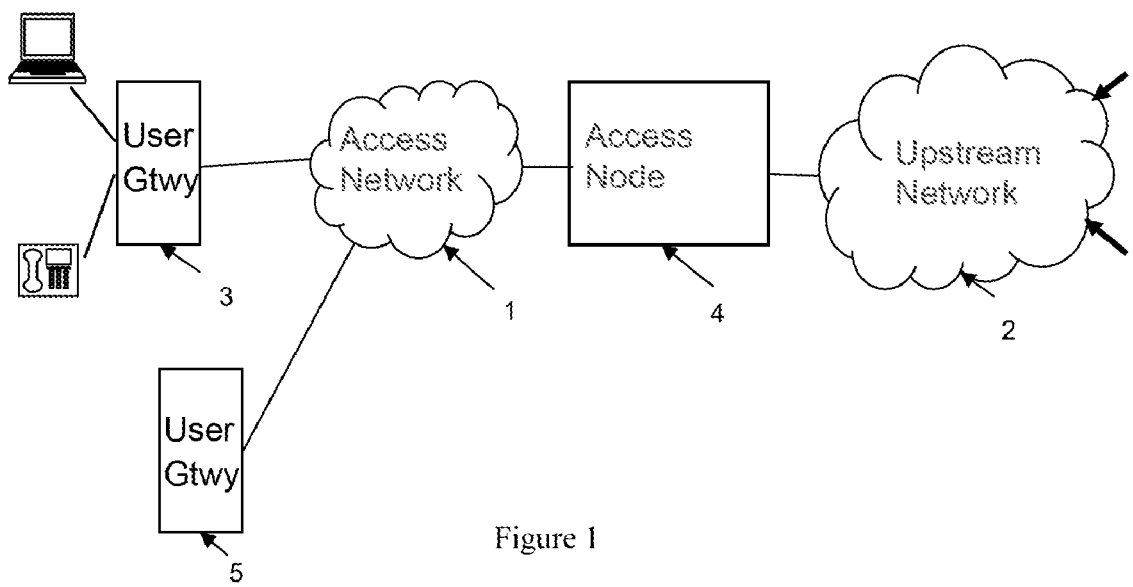
FIG. 1 represents a packet communications network architecture.
Figure 4:
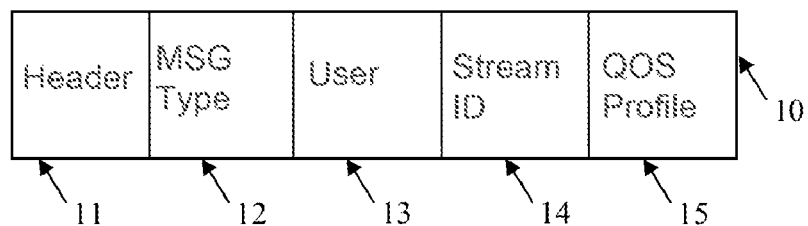
FIG. 4 represents a configuration message used in one particular implementation of an embodiment of the invention.

FIG. 1 represents part of a packet communications network including an access node 4 and two user gateways 3 and 5. The access node 4 connects users to the upstream network 2 via an access network 1.

In a first particular implementation, the access node 4 is a digital subscriber line access module (DSLAM) and the access network 1 is a digital subscriber line (xDSL).

In a second particular implementation, the access node 4 is a routing node located upstream of the DSLAM. The access network 1 then includes, in addition to the user's digital subscriber line xDSL, a sub-network between the access node and the DSLAM that is shared by a plurality of users.

In a third particular implementation, the access network 1 is a wireless network that connects a plurality of users to the upstream network 2 via a wireless access node 1.

A user gateway 3, 5 constitutes the unique entry point to the devices of the user, for example a telephone or a computer. It is located on the user premises. The gateway sends packets in the uplink direction from the gateway 3, 5 to the access node 4, for example applying different quality-of-service profiles as a function of the application concerned, and routes incoming packets, i.e. packets sent by the access node 4 to the gateway 3, 5, to the device of the user and the application concerned in the user installation.

The user gateway can constitute an access point shared between a number of users, for example belonging to a business or a user collective.

Figure 7:
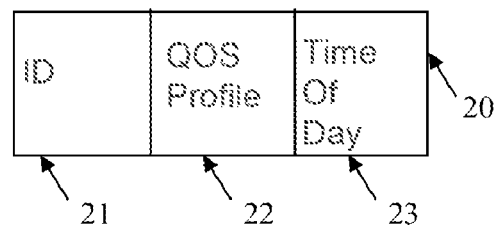
FIG. 7 represents a stream description.

The access node 4 uses a table 205 of streams. A stream description 20 comprises the following elements, as represented in FIG. 7:

an identifier 21 of the stream;

a quality-of-service profile 22 associated with the stream; and a time-of-day 23 corresponding to the time-of-day at which the latest information concerning the stream was received.

A quality-of-service profile 22 can contain the following information:

a priority, for defining the relative priorities of the packets;

a weight associated with a stream: where packets have the same priority level, the bit rate produced by the stream is proportional to the weight;

a maximum bit rate that the stream can achieve; and a minimum bit rate that the stream must be able to achieve when it has packets to transmit.

The table 205 of streams stores stream descriptions 20 for a user. It can optionally store stream descriptions for a plurality of users.

The remainder of the description refers to a situation in which the access node 4 has one table 205 for each user.

The user gateway 3, 5 uses a table 105 of streams that stores stream descriptions 20.

Figure 2:
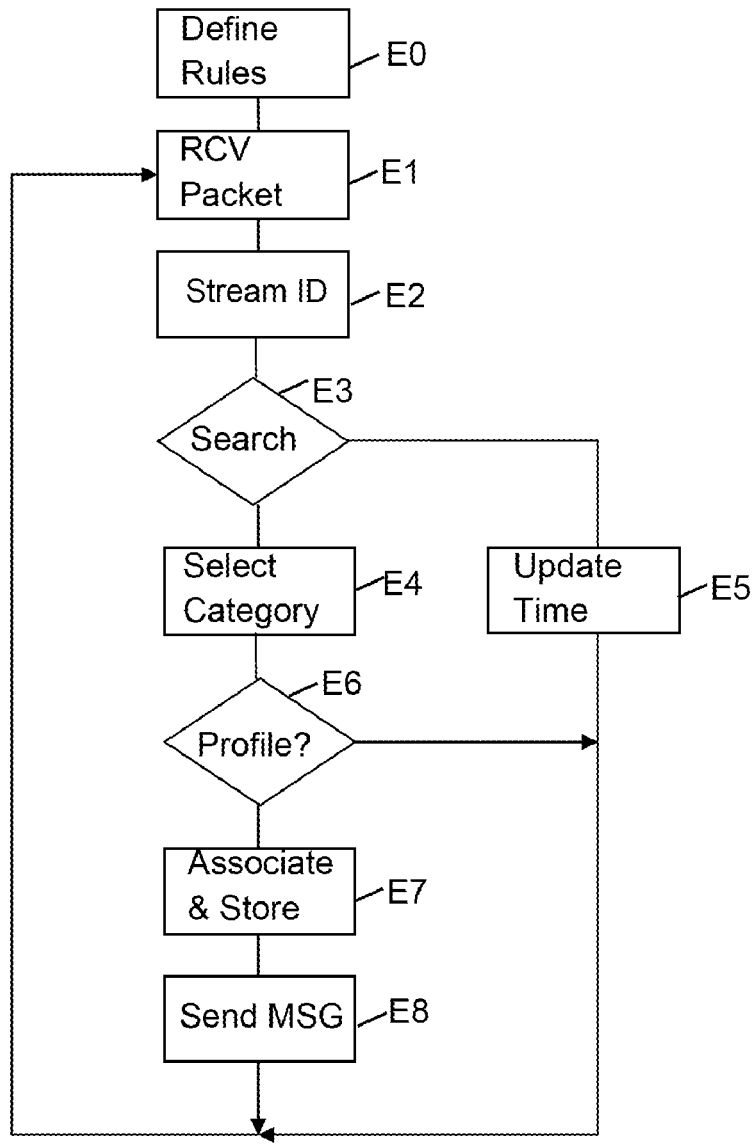
FIG. 2 represents steps of the method executed in a user gateway in one particular implementation of an embodiment of the invention.

The method of configuring the quality-of-service profile of a given stream at an access node 4 of a packet communications network to which a user gateway 3, 5 is connected is described below with reference to FIGS. 2 and 3.

Figure 3:
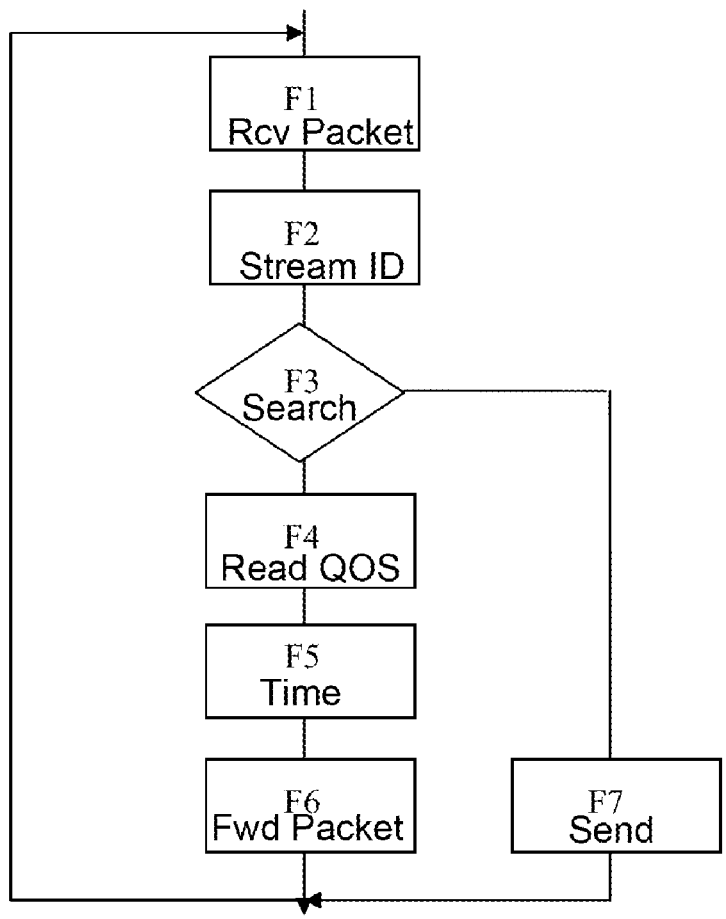
FIG. 3 represents steps of the method executed in an access node in one particular implementation of an embodiment of the invention.

The steps of the method executed in the access node are described first with reference to FIG. 3.

In a first step F1 of the method executed in the access node 4 the access node receives a packet whose destination is the user gateway 3, 5. In a second step F2, the access node determines an identifier of the stream.

In a third step F3, it searches the table 205 for the stream identifier. The table 205 is optionally searched by calculating the result of applying to an identifier of the incoming stream a hashing function such as the secure hash algorithm (SHA-1) function and looking for this result in the table 205.

If the result of the search is negative, i.e. if there is no stream description corresponding to the stream identifier 21 in the table 205, the access node sends the packet to the user gateway 3, 5 in a step F7, applying a default quality-of-service profile. This profile must enable transmission of streams not yet stored in the table 205 without this degrading the quality of service of streams whose quality-of-service profile is known to the access node, in other words is already stored in the table 205. It can be a question of reserving a portion of the available bandwidth to prioritize routing unknown streams. The method returns to the step F1 and waits to receive a packet.

If the search result is positive, i.e. if there is a stream description corresponding to the stream identifier 21 in the table 205, the access node reads in the stream description that has been found a quality-of-service profile 22 associated with the identifier 21 of the stream in the stream table 205 associated with the node in a step F4 and in a step F5 updates the time-of-day 23 of the stream description that has been found using the time-of-day at which the access node received the packet. Then, in a step F6, the packet is forwarded to a scheduling process, for example a weighted fair queuing (WFQ) scheduling process, for transmission to the user gateway 3, 5 using the quality-of-service profile associated with the stream identifier. The method returns to the step F1 and waits to receive a packet.

The steps of the method executed in a user gateway are described below with reference to FIG. 2.

A preliminary definition step E0 defines rules associating stream categories related to quality-of-service requirements, i.e. defines user preferences. For the uplink direction there are processes for associating quality-of-service profiles as a function of the application. Thus users can set uplink parameters of their gateway, for example, so that, when using a telephone over IP application, maximum priority is assigned to the packets of the telephone call, to the detriment of other, non-real-time applications. The step of defining rules thus defines stream categories as a function of criteria, in particular as a function of the application concerned, and associates a quality-of-service profile therewith. Thus if a user uses a particular application in a peer-to-peer network, the gateway parameters are set as a function of the TCP or UDP port used by that application, in order to associate therewith an uplink quality-of-service profile. In a gateway to which a plurality of users are connected, the stream categories can also take the end user into account.

This preliminary step E0 therefore associates a downlink quality-of-service profile in the same way. The method thus controls the definition of the quality-of-service profile to be applied by the access node in the downlink direction from the user gateway. It is particularly effective in applications that use dynamic ports defined arbitrarily, such as file sharing applications in a peer-to-peer network. It is also effective in applications in which the content of the packets is encrypted, including the port numbers.

The user can also choose to block a particular stream by associating a particular quality-of-service profile with it: a null priority or a null maximum bit rate.

In the step E1 of the method executed by the user gateway 3 the user gateway receives a packet from an access node 4. In a second step E2, an identifier of the stream is determined.

In a third step E3, the table 105 is searched for the stream identifier. The table 105 is optionally searched by calculating the result of applying to an identifier of the incoming stream a hashing function such as the SHA-1 function and looking for this result in the table 105.

If the search result is positive, i.e. if there is a stream description corresponding to the stream identifier 21 in the table 105, the time-of-day 23 of the stream description that has been found is updated in a step E5 using the time-of-day at which the gateway received the packet. The packet is then forwarded to the application concerned. The method returns to the step E1 and waits to receive a packet.

If the search result is negative, i.e. if there is no stream description in the table 105 corresponding to the stream identifier 21, in a determination step E4, and at its own initiative, the gateway selects for this stream the stream category for the quality-of-service requirements to which it corresponds, as a function of rules defining stream categories determined in the step E0, for example based on information contained in the packet: TCP or UDP ports, source address, application concerned, end user, terminal equipment, etc. These rules are specific to the gateway. In a step E6, the method determines as a function of the selected stream category if the streams of that category are associated with a quality-of-service profile.

If the streams of that category are not associated with a quality-of-service profile, the method returns to the step E1 of waiting to receive a packet.

If the streams of that category are associated with a quality-of-service profile, a quality-of-service profile is to be associated with the identifier of the stream as a function of the stream category and, in a step E7, the gateway stores in the stream table 105 an identifier 21 of the stream, a quality-of-service profile 22, and a time-of-day 23 corresponding to the time-of-day at which the gateway received the packet. For example, a user can give maximum priority to networked game applications in order to benefit from high interactivity. In a step E8, the gateway sends to the access node a message 10 for configuring the quality-of-service profile of the stream in the access node. The gateway preferably sends the message 10 to the access node in a secure manner. The message includes the following elements, for example:

a header 11 corresponding to that of the network protocol used, for example TCP/IP;

a field 12 representing a message type, enabling the access node 4 to identify the action that it must perform in the stream table 205 associated with the access node;

a field 13 representing the user that the action indicated in the message type field concerns;

a field 14 representing the identifier 21 of the stream that the message 10 concerns; and a field 15 representing a quality-of-service profile to be associated with the stream that the message concerns.

The field 12 representing a message type can take values such as "creation", "modification", "elimination".

In the step E8, the message 10 includes "creation" in the message type field 12. The processing effected by the access node on reception of this message is described below with reference to FIG. 8.

The method returns to the step E1 and waits to receive a packet.

The method further includes a step, not shown in the figures, of eliminating streams that have been inactive for a particular time period from the stream table 105 associated with the gateway. This step can be executed periodically and can optionally trigger sending the access node 4 a message 10 with "elimination" in the message type field 12 in order to modify consistently the stream table 205 associated with the access node.

The gateway can optionally modify in the same way the profile of a stream stored in the table 205 and send the access node a message 10 with "modification" in the message type field 12 in order to modify consistently the stream table 205 associated with the access node. This modification can take place following an event requiring updating of the relative priorities of the current streams, for example. It can in particular downgrade the priority of a stream to the benefit of other, later streams.

In another implementation, a packet of a stream is received in the step E1. During a step of decoding the packet received by the application that this stream concerns, not shown in the figures, the user gateway obtains information that a new stream will be created for transmission of packets between the access node and the user gateway. The step of determining a quality-of-service profile is triggered by the stream creation information. Then, at its own initiative, the gateway determines a stream category to which this new stream belongs as a function of the information sent by the application concerned and proceeds to the step E6 of associating a quality-of-service profile with the new stream as a function of the stream category. The steps E6 to E8 are then executed as described above.

Figure 8:
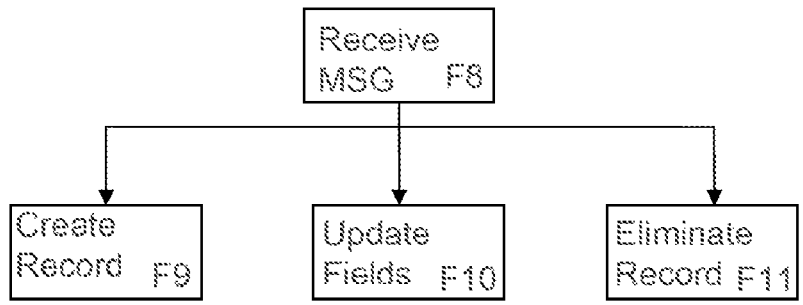
FIG. 8 represents steps of the method executed in an access node on reception of a configuration message.

The method of managing the table 205 of streams associated with the access node 4 is described below with reference to FIG. 8.

In the step F8, the access node receives a message 10 indicating that action is required in the table 205 of streams associated with the access node 4.

The action to be effected depends on the content of the message type field 12.

If it contains "creation", then in the step F9 the access node creates a new record in the table 205 of the user indicated in the field 13 representing the user concerned and the stream description 20 is initialized as a function of the elements received. The access node copies the field 14 representing the identifier of the stream concerned into the field 21 of the stream description. It also copies the field 15 representing a quality-of-service profile to be associated with the stream concerned into the field 22 of the stream description and initializes the field 23 of the field description with the time-of-day at which the access node received the message 10.

If it contains "modification", then in the step F10, in the table 205 of streams of the user indicated in the field 13 representing the user concerned, the access node updates the fields of the stream description 20 of the stream identified in the field representing the identifier of the stream, as a function of the information received in the message 10. It also copies the field 15 representing the quality-of-service profile to be associated with the stream concerned into the field 22 of the stream description and initializes the field 23 of the field description with the time-of-day at which the message 10 was received.

It is contains "elimination", then in the step F11 the access node eliminates the record from the table 205 of streams of the user indicated in the field 13 representing the user concerned.

In another implementation, the method further includes a step, not represented in the figures, of eliminating from the table 205 of streams associated with the access node streams that have been inactive for a particular time period. This step can be executed periodically.

The user gateway is described below with reference to FIG. 5.

Figure 5:
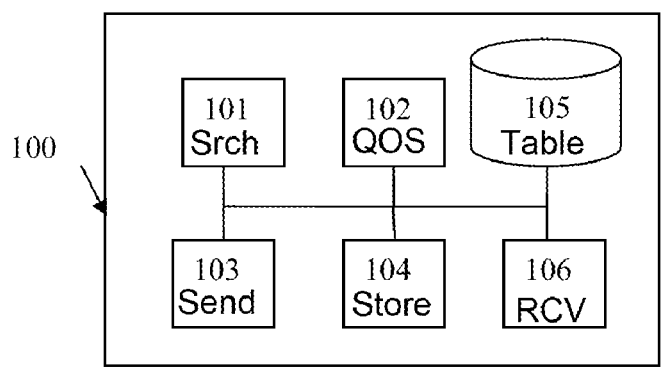
FIG. 5 represents a user gateway of an embodiment of the invention.

Referring to FIG. 5, the user gateway includes:

a table 105 of streams adapted to store stream descriptions 20;

means 106 for receiving packets of streams coming from an access node;

means 102 for determining a quality-of-service profile to be associated with a stream following reception of a packet from the access node; and means 103 for sending the access node the quality-of-service profile determined by the determination means 102 to be associated with a given stream.

In one particular implementation, the gateway also includes:

means 101 for searching the table 105 of streams for a stream identifier of a received packet; and means 104 for storing in the table 105 of streams a stream description 20 including the quality-of-service profile to be associated with a given stream identifier determined by the determination means 102 if the result of the search of the table 105 by the search means 101 is negative for a given stream.

The access node is described below with reference to FIG. 6.

Figure 6:
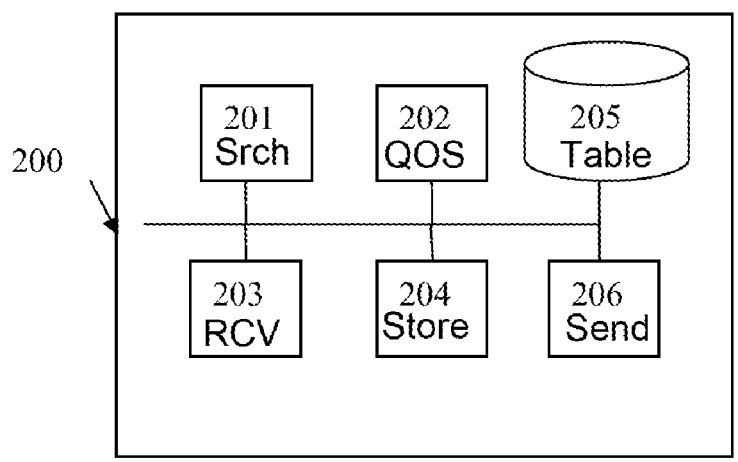
FIG. 6 represents an access node of an embodiment of the invention.

Referring to FIG. 6, the access node 200 includes:

a table 205 of streams adapted to store stream descriptions 20;

means 201 for searching the table 205 of streams for a quality-of-service profile associated with a stream identifier;

means 202 for associating a quality-of-service profile with a stream as a function of the result of the search of the table 205 of streams by the search means 201;

means 203 for receiving from the gateway a quality-of-service profile to be associated with a stream;

means 204 for storing in the table 205 of streams the quality-of-service profile received by the reception means 203 and for associating with the identifier the stream concerned; and means 206 for sending packets of streams to user gateway(s) as a function of a quality-of-service profile associated with the streams.

The modules 101, 102, 103, 104 that implement the method described above are preferably software modules including software instructions for executing the steps of the method described above executed by the user gateway 100.

The modules 201, 202, 203, 204 that implement the method described above are preferably software modules including software instructions for executing the steps of the method described above executed by the access node 200.

The software modules can be stored in or transmitted by a data medium. This can be a hardware storage medium, for example a CD-ROM, a magnetic diskette or a hard disk, or a transmission medium, for example an electrical, optical or radio signal, or a telecommunications network.

An aspect of the invention further consists in:

a program for configuring stream quality-of-service profiles for a packet communications network access node, the program including program instructions for receiving from a gateway a quality-of-service profile to be associated with a stream and for storing the received quality of service to be associated with the stream concerned in a table of streams, said profile being used by the access node to transmit packets of the stream concerned whose destination the gateway when said program is executed by the access node;

a storage medium that can be read by an access node and in which the program described above is stored.

An aspect of the invention further consists in:

a program for use by a user gateway of a packet communications network to control the configuration of stream quality-of-service profiles in an access node of said network, the program including program instructions for executing those of the steps of the method described above that are executed by said gateway, when said program is executed by the gateway;

a storage medium that can be read by a user gateway in which the program described above is stored.

Although the present disclosure has been described with reference to one or more examples, workers skilled in the art will recognize that changes may be made in form and detail without departing from the scope of the disclosure and/or the appended claims.

The invention claimed is:

1. A method of configuring a quality-of-service profile of a given stream, said method including:

a step of a user gateway receiving a packet with a default quality-of-service profile from an access node in a packet communications network, said user gateway connecting user devices to the access node and being the destination of said stream, and wherein said packet belongs to said stream and said stream corresponds to packets sent from the access node to the user gateway and having common characteristics;

a step of the user gateway determining an identifier of the stream from the received packet;

a step triggered by the reception of the packet by the user gateway from the access node in which, at the user gateway's own initiative upon reception of the packet, the user gateway determines from the determined identifier of the stream a quality-of-service profile to be associated with further packets of the given stream sent from the access node to the user gateway, following reception of the received packet from the access node;

a step in which the user gateway sends to the access node the quality-of-service profile associated with the stream, as determined in this way; and a step of the user gateway receiving the further packets of the stream from the access node according to the quality of service profile sent by the user gateway to the access node and associated with the stream.

2. The method according to claim 1, in which, the steps of determining and sending the quality-of-service profile are effected after the user gateway performs steps of:
   searching a table of streams, which is associated with the user gateway and stores quality-of-service profiles associated with stream identifiers, for an identifier of the given stream, and
   if the search result is negative, associating the given stream with the quality-of-service profile and storing the quality-of-service profile and the identifier of the given stream in the table of streams.

3. The method according to claim 1, including, on reception by the access node of a further packet of the given stream whose destination is the user gateway:
   a step of the access node searching for a quality-of-service profile associated with the identifier of said given stream in a table of streams that is associated with the access node and that stores quality-of-service profiles associated with streams; and
   if a result of the search is negative, a step of sending the further packet to the user gateway using the default quality-of-service profile.

4. The method according to claim 1, further including a preliminary step of defining stream categories related to quality-of-service requirements and wherein the step of determination by the user gateway of a quality-of-service profile to be associated with the given stream includes:
   a substep of selecting one of said categories for the given stream; and
   a substep of associating with an identifier of the given stream, as a function of the category selected, a quality-of-service profile associated with said category.

5. The method according to claim 1, wherein a parameter of a time of arrival of the packet of a stream is associated with an identifier of the given stream, said parameter being updated in tables of streams respectively associated with the access node and the gateway on reception of a new packet of the given stream, said method further including a step of eliminating streams inactive for a particular time period.

6. The method of claim 1, wherein the step in which the user gateway sends to the access node the quality-of-service profile comprises:
   generating a signal conveying an access node configuration message including the determined quality-of-service profile that is to be associated with a given, the configuration message comprising a field representing the identifier of the given stream, a field representing the quality-of-service profile to be associated with the given stream, and a field representing a message type indicating an action to be performed on a table of streams by the access node for the given stream; and
   sending the signal by user gateway to the access node.

7. The method of claim 6, and further comprising setting the message type field to a value representing an action selected from the group consisting of:
   creating, by the access node, a new record of the quality-of-service to be associated with the given stream in the table;
   modifying an existing record in the table to update the quality-of-service to be associated with the given stream; and
   eliminating an existing record in the table associated with the given stream.

8. A packet communications network user gateway comprising:
   means for receiving a packet from an access node with a default quality-of-service profile, wherein the packet belongs to a stream of packets sent from the access node to the user gateway and having common characteristics, wherein the packets of the stream are routed through the user gateway to a user device connected to the user gateway;
   means for determining an identifier of the stream from the received packet, the stream corresponding to packets having common characteristics,
   means for determining from the determined identifier of the stream, at the user gateway's own initiative, a quality-of-service profile to be associated with further packets of the stream sent by the access node to the user gateway, following reception of the received packet from the access node;
   means for sending to the access node the determined quality-of-service profile for association with that stream; and
   means for receiving the further packets of the stream from the access node according to the determined quality of service profile sent by the user gateway to the access node and associated with the stream.

9. A system in a packet communications network including at least a user gateway according to claim 8.

10. A program stored on a hardware storage medium for use by a user gateway of a packet communications network, the program including program instructions for configuring a quality-of-service profile of a given stream in an access node when said program is executed by the gateway, wherein the method comprises:
   a step of the user gateway receiving a packet from an access node in a packet communications network with a default quality of service profile, said user gateway connecting user devices to the access node and being the destination of said stream, and wherein said packet belongs to said stream and said stream corresponds to packets sent from the access node to the user gateway and having common characteristics;
   a step of the user gateway determining an identifier of the stream from the received packet;
   a step triggered by the reception of the packet by the user gateway from the access node in which, at user gateway's own initiative upon reception of the packet, the user gateway determines from the determined identifier of the stream a quality-of-service profile to be associated with further packets of the stream sent from the access node to the user gateway, following reception of the received packet from the access node;
   a step in which the user gateway sends to the access node the quality-of-service profile associated with the stream, as determined in this way; and
   a step of the user gateway receiving the further packets of the stream from the access node according to the quality of service profile sent by the user gateway to the access node and associated with the stream.

11. A hardware storage medium that can be read by a user gateway in which a program according to claim 10 is stored.

12. A method of configuring a quality-of-service profile of a given stream, said method including:
   a step of a user gateway receiving a packet from an access node in a packet communications network, said user gateway connecting user devices to the access node and being the destination of said stream, and wherein said packet belongs to said stream and said stream corresponds to packets sent from the access node to the user gateway and having common characteristics;

a step of the user gateway determining an identifier of the stream from the received packet a step triggered by the reception of the packet by the user gateway from the access node, in which, at the user gateway's own initiative upon reception of the packet, the user gateway determines from the determined identifier of the stream, as a function of a stream category, a quality-of-service profile to be associated with further packets of the given stream sent from the access node to the user gateway, following reception of the received packet from the access node;

a step in which the user gateway sends to the access node the quality-of-service profile associated with the given stream, as determined in this way; and a step of the user gateway receiving the further packets of the stream from the access node according to the quality of service profile sent by the user gateway to the access node and associated with the stream.

13. The method according to claim 12, in which, the steps of determining and sending the quality-of-service profile are effected after the user gateway performs steps of:

searching a table of streams, which is associated with the user gateway and stores quality-of-service profiles associated with stream identifiers, for an identifier of the given stream, and if the search result is negative, associating the given stream with the quality-of-service profile and storing the quality-of-service profile and the identifier of the given stream in the table of streams.

* * * * *